March 24, 1959 C. E. BRANDT ET AL 2,878,868
CUTTING MACHINE
Filed Sept. 7, 1956. 6 Sheets-Sheet 1

Fig. 1.

INVENTORS
CARL E. BRANDT
DON K. WARSAW
-BY-
ATTORNEY

United States Patent Office 2,878,868
Patented Mar. 24, 1959

2,878,868

CUTTING MACHINE

Carl E. Brandt and Don K. Warsaw, Grand Rapids, Mich.

Application September 7, 1956, Serial No. 608,552

9 Claims. (Cl. 164—35)

This invention relates to cutting machines which may utilize a reciprocating or an endless flexible band knife. The invention particularly involves a method and a mechanism for handling the work pieces during the cutting operation so that they are accurately positioned without creating a tendency to jam the operation of the knife. The principal field of utility of this invention, as it has developed, has been in the performance of slicing operations on rubber, which may be either with or without core material.

The manufacture of casing patches for vehicle tires, according to a procedure developed by applicants, involves the cutting of portions from existing tire casings. These portions are then formed through cutting operations so that they are tapered to reduced thickness at the edges in order to minimize discontinuity in a repaired casing. It is very important that the degree of taper be held at practically the smallest acute angle that can be handled in a cutting machine. If the degree of taper is too rapid, the structural discontinuity which results in the repaired tire will be such as to cause undue deflection at the edge of the patch, and encourage the breakdown of the casing. No cutting machine is known to applicant which will effectively slice material from portions of tire casings to create an angle of taper which is as small as can be provided by machines embodying this invention.

A machine embodying this invention positions the work piece between two rollers, with the path of the knife being established by a suitable guideway system. One of these rollers is relatively fixed with respect to the frame of the machine, and determines the shape of the workpiece by its position with respect to the knife. The other of the two rollers is preferably resiliently mounted, and applies a clamping pressure for accurately positioning the workpiece and securing the necessary traction thereon. Preferably both of these rollers are supplied with power, and each serves not only to position the workpiece but to feed it through the cutting area. The particular curvature of tire casings establishes a need for the feeding rollers to accommodate pieces of varying thickness and having non-planar surfaces. The relationship between the lines of contact of the rollers, the position of the cutting edge, and the position of the deflecting surface behind the cutting edge tend to move the workpieces and the scrap smoothly away from the cutting area.

The accommodative capacity of the rollers must be sufficient not only to receive pieces of original casings of varying thickness, but must also be capable of handling workpieces after successive passes through the machine, each of which varys the thickness and usually the angular relationship of the surface. This capacity for accommodation is provided by a resilient mounting of one of the rollers which yields to the variations of the workpieces which are fed into the machine. Preferably, the angular variations of the yieldable roller with respect to the relatively fixed one are provided for by a pivotal mounting permitting the axis of the yieldable roller to assume an angular variation with respect to the path of movement of the knife. The axis of this pivotal mounting is preferably in a plane perpendicular to the path of the knife. A second degree of freedom of movement is provided by mounting the yieldable roller so that it is also free to pivot about an axis generally parallel to the path of movement of the knife, but remote therefrom. Angular movement about this second pivotal mounting serves to accommodate variation in thickness of material.

The several features of this invention will be discussed in detail through an analysis of the particular embodiments illustrated in the accompanying drawings. In the drawings.

Figure 1:
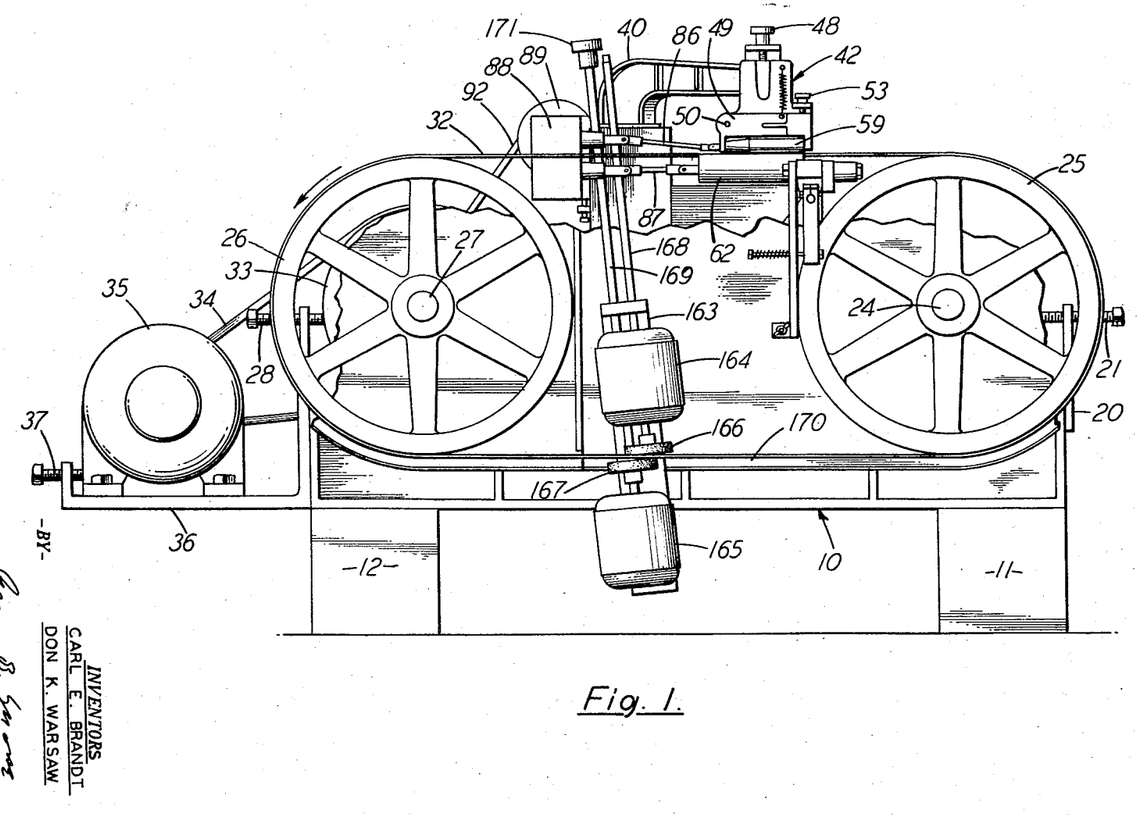
Figure 1 presents a side elevation of a machine embodying this invention.
Figure 2:
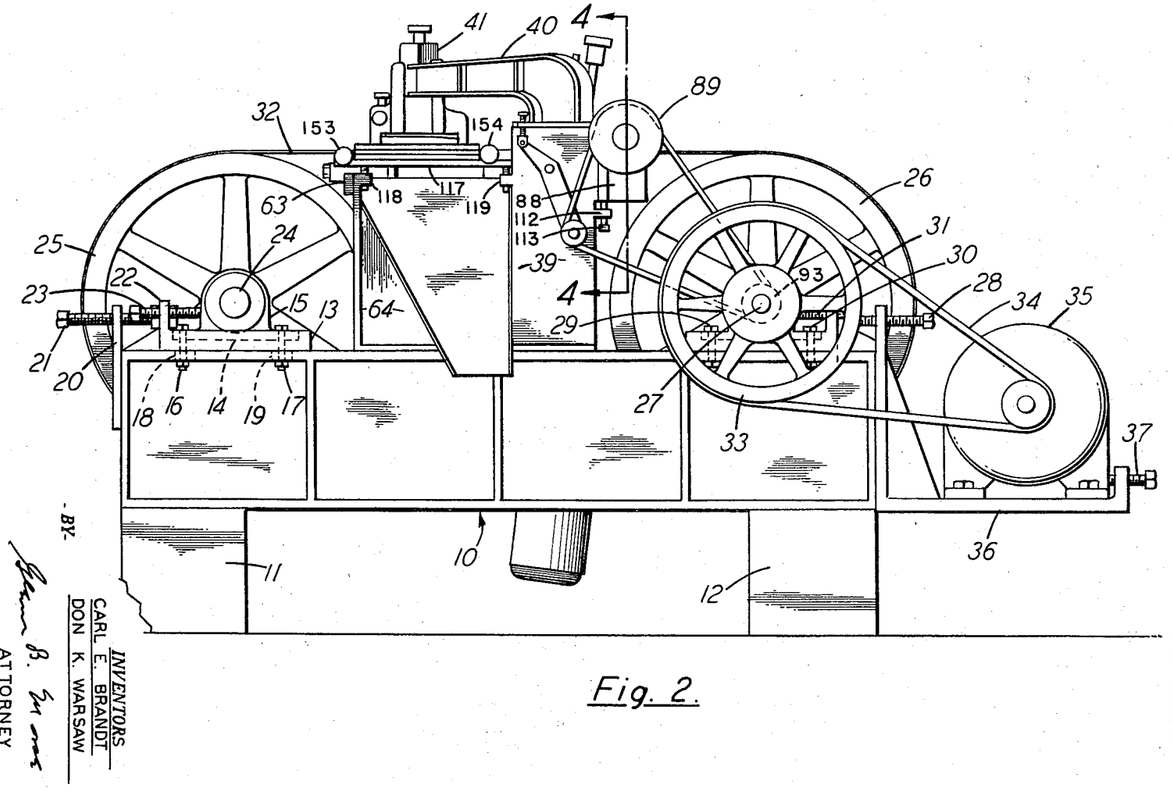
Figure 2 presents a side elevation from the opposite side of the machine from that of Figure 1.

Referring particularly to Figures 1 and 2, the frame 10 includes base members 11 and 12. A plate 13 (refer to Figure 2) is provided with a shallow cylindrical recess 14 in its upper surface for receiving the base of the bearing block 15. Arcuate slots in the base of the bearing block 15 accommodate the bolts 16 and 17, which also pass through slots 18 and 19 in the frame 10, which are parallel to the plane of the views of Figures 1 and 2. A bracket 20 is fixed with respect to the frame 10, and provides a support for the adjusting screw 21. The inner end of this screw engages a projection fixed with respect to the plate 13, and adjustment of the screw 21 (when the bolts 16 and 17 are loose) will permit the bearing block 15 to be moved with respect to the frame 10 within the limitations imposed by the slots 18 and 19. A bracket 22 is mounted on the plate 13, and supports the adjusting screw 23. The inner end of the adjusting screw bears on a portion of the bearing block 15 at a point eccentric to the cylindrical recess 14. Adjustment of the screw 23 while the bolts 16 and 17 are loose will permit the bearing block 15 to be rotated with respect to the frame on a vertical axis.

A shaft 24 is supported by the bearing block 15, the shaft 24 carrying the wheel 25. Similar structure is positioned at the opposite end of the frame 10, whereby the wheel 26 is mounted on the shaft 27, and adjustably positioned with respect to the frame 10. Manipulation of the screw 28 while the bolts 29 and 30 are loosened varies the position of the shaft 27 in a direction parallel to the plane of the views of Figures 1 and 2, and the adjustment of the screw 31 alters the angular position of the shaft about a vertical axis.

The wheels 25 and 26 serve to position the endless flexible band knife 32, similar portions of the wheels 25 and 26 being in co-planar relationship. A drive pulley 33 is fixed with respect to the shaft 27 and is driven through the belt 34 by the motor unit 35 supported on the bracket 36 mounted on the frame 10. An adjusting screw 37 serves to position the motor 35 with respect to the shaft 27 for adjustment of belt tension.

The upper portion 39 (refer to Figure 2) of the frame 10 provides a support for the cantilever arm 40, the outer end of which terminates in a bracket 41. A slide member 42 is provided with guideways for receiving the surfaces 43 and 44 (refer to Figure 3) of the bracket 41 in sliding relationship, and a threaded member 45 engages a correspondingly threaded hole in the boss 46 of the slide member with respect to the flange 47 on the bracket 41. A knob 48 is mounted on an upper extension of the threaded member 45 for facilitating the manual adjustment thereof. Manipulation of the knob 48 causes the slide member 42 to move in a vertical direction with respect to the frame 10.

A member 49 is pivotally mounted on the slide 42 at the pin 50. A projection 51 on the slide member 42 is engaged by a bolt 52 positioned by a knob 53, the lower end of the bolt 52 bearing against the member 49. A spring 54 continuously urges the member 49 in a counter-clockwise direction about the pin 50 into engagement with the stop provided by the bolt 52.

The member 49 is provided with a preferably integral bearing 54, and with a removable plate 55 carrying a bearing 56. The plate 55 is secured to the member 49 with screws as indicated at 57 and 58. A roller 59 is carried between the bearings 54 and 56, the roller 59 having a conical portion 60 and a cylindrical portion 61. Adjustment of the knobs 48 and 53 will determine the vertical position and the angular position of the axis of the roller 59 with respect to the frame, and also with respect to the path of movement of the endless band knife 32.

Figure 7:
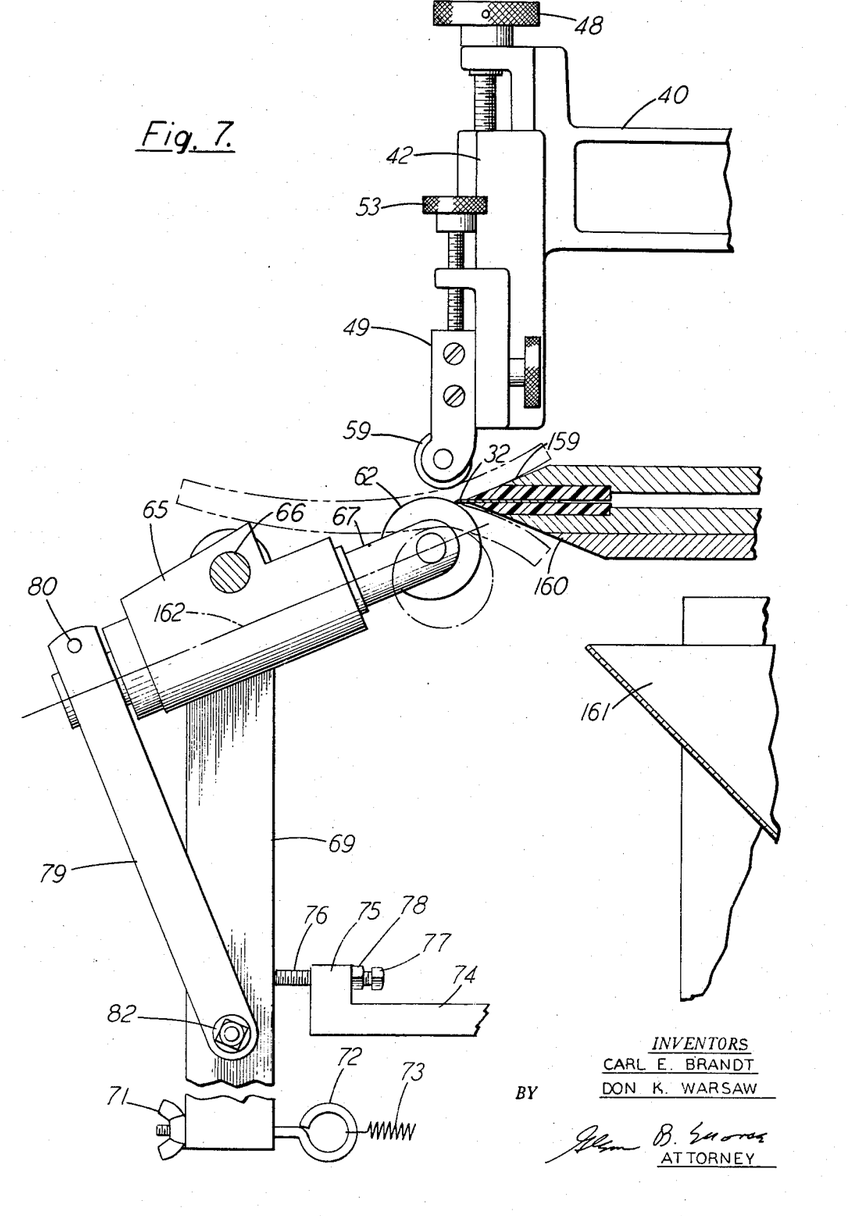
Figure 7 presents a section on an enlarged scale on a plane normal to the cutting knife and in the area adjacent the feed rollers.

A lower roller 62 is resiliently mounted with respect to the upper roller 59 on a fixed bracket 63 secured to the section 64 of the frame 10 (refer to Figure 2). The mechanism responsible for providing the resiliency includes a bearing block 65 rotatably mounted on a bolt 66 which is positioned by the bracket 63 (refer to Figure 3). A shaft 67 is rotatably supported in the bearing block 65 on an axis sufficiently eccentrically disposed from the axis of the bolt 66 to eliminate interference. The roller-supporting shaft 68 (refer to Figure 5) is secured to the end of the shaft 67, and extends laterally therefrom. Rotation of the roller 62 about the axis of the shaft 67 (refer to Figures 3 and 7) permits the roller 62 to assume an angular variation of position with respect to the roller 59; and rotation of the bearing block 65 about the axis of the bolt 66 causes the assembly including the roller 62 and the shaft 67 to rotate about an axis generally parallel to that of the band knife 32, and sufficiently remote therefrom to cause variations in the distance between the roller 59 and the roller 62.

An arm 69 is fixed with respect to the bearing block 65. A small bearing plate 70 is fixed with respect to the arm 69, and provides a seat for the wing nut 71 which engages an eye bolt 72 serving as a terminal for the spring 73 (refer to Figures 3 and 7). The opposite end of the spring 73 is secured to the frame 10, the action of the spring therefore applying a continuous biasing effect tending to bring the roller 62 toward the roller 59. A limit to this movement is provided by a stop in the assembly which includes an arm 74 which is rigidly secured to the frame 10, and has a portion 75 having a threaded hole engaged by a bolt 76. Adjustment of the head 77 of this bolt, followed by a setting of the lock nut 78, will establish a limit position to the arm 69 in its rotation in a counter-clockwise direction about the bolt 66 (refer to Figure 7).

Figure 3:
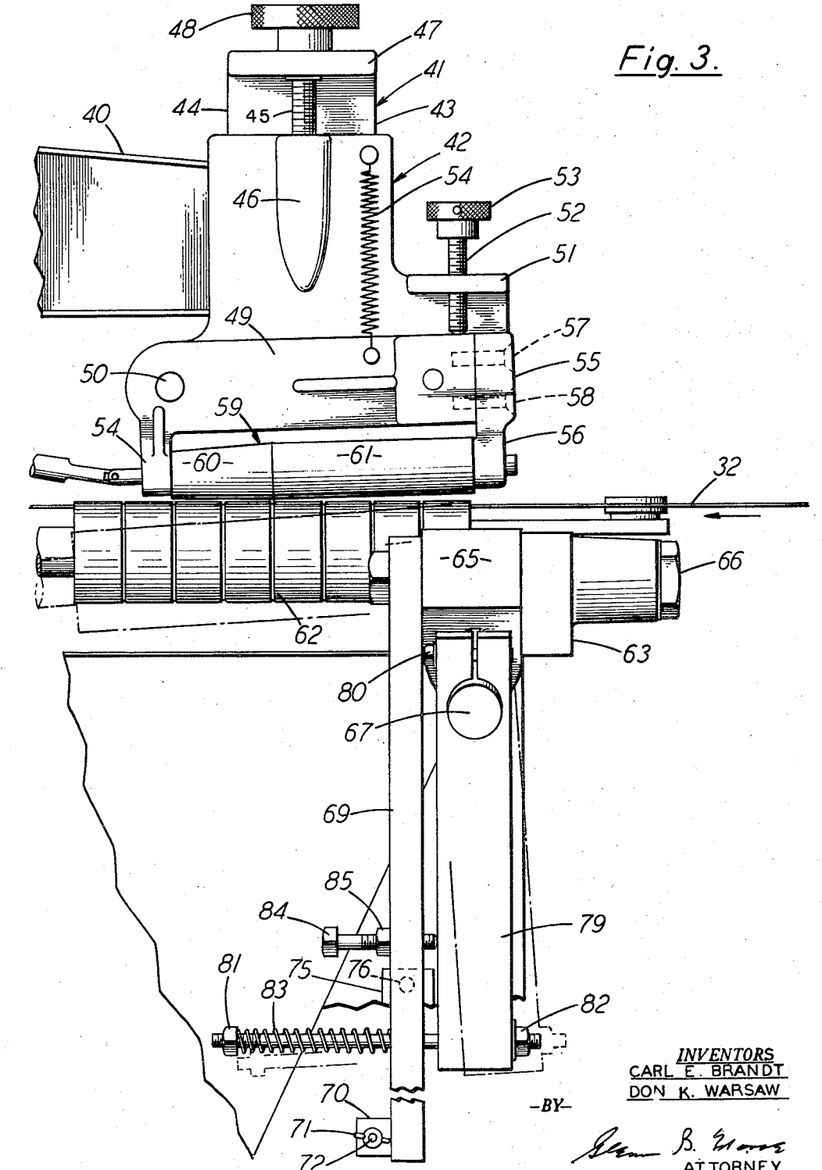
Figure 3 presents a view on an enlarged scale and in side elevation of the mechanism surrounding the feed and positioning rollers.

A radius arm 79 engages the shaft 67, and is clamped to a fixed angular relationship with respect thereto by the bolt 80. A bolt 81 traverses an appropriately located hole in the arm 69, and also a hole in the arm 79. Withdrawal of the bolt 81 to the left, as shown in Figure 3, is prevented by the nut 82. A spring 83 is positioned by the head of the bolt 81 and acts against the arm 69, causing a biasing effect to be applied to the arm 79 tending to rotate the shaft 67 in a clockwise direction, as shown in Figure 3. A bolt 84 engages a threaded hole in the arm 69, and may be adjusted to provide a stop to the movement induced by the spring 83. A lock nut 85 is provided to secure the adjusted position.

The rollers 59 and 62 are driven through shafts 86 and 87, respectively, which are provided with universal joints at their opposite ends. A gear box 88 distributes power to the two shafts, and at a relative speed of rotation such as will create approximately the same peripherial speed of the roller 59 as that of the roller 62. The roller 62 is generally cylindrical, except for its knurled surface, and is of larger diameter than either the smaller conical portion 60 or the cylindrical section 61 of the roller 59.

Figure 4:
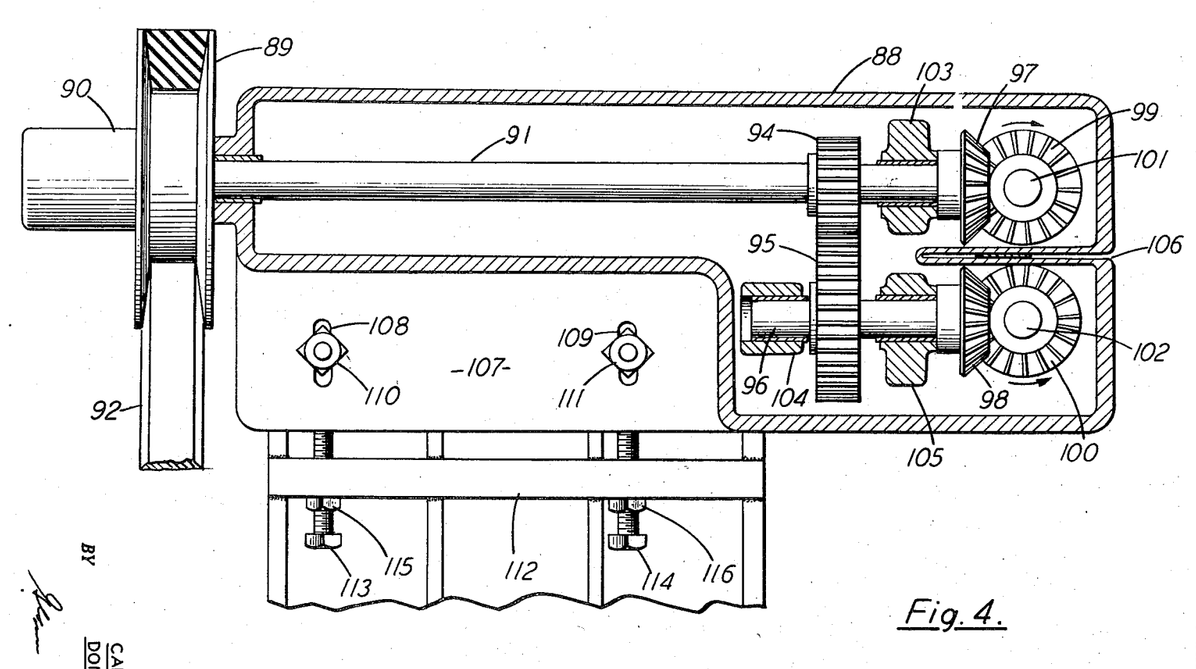
Figure 4 presents a section on an enlarged scale of the power transfer mechanism controlling the feed and positioning rollers.

The details of the power-transmission system within the gear box 88 are best shown in Figure 4. A pulley 89 is preferably provided with a disengageable clutch assembly generally indicated at 90, and serves to rotate the shaft 91 as a result of the power delivered to the belt 92 from the driving pulley 93 mounted on the shaft 27. A gear 94 is mounted on the shaft 91 and engages the gear 95 mounted on the stub shaft 96. The relative pitch diameters of the gears 94 and 95 determine the respective rotational speeds of the beveled gears 97 and 98, which respectively mesh with similar beveled gears 99 and 100. The shafts 101 and 102 are respectively associated with the shafts 86 and 87, and deliver power to the positioning rollers 59 and 62. Bearing supports within the housing 88 are provided as shown at 103, 104, and 105. The housing is slotted at 106 to admit the endless band knife 32, which is adjacent to the axes of the driving rollers. The necessity of accurately positioning the housing with respect to the path of the moving blade requires the presence of a vertical adjustment between the housing and the frame 10. A flange 107 is provided with the elongated slots 108 and 109, which are engaged by the bolts 110 and 111, respectively. These bolts engage the frame 10, and maintain the adjusted position of the housing. A flange 112 is fixed with respect to the housing 10. Bolts 113 and 114 engage threaded holes in the flange 112 and provide means for obtaining an accurate adjustment of the gear box assembly 88. The lock nuts 115 and 116 may be used to fix the adjusted position or maintain a desirable resistance to rotation to facilitate the positioning of the gear box prior to the tightening of the bolts 110 and 111.

Figure 5:
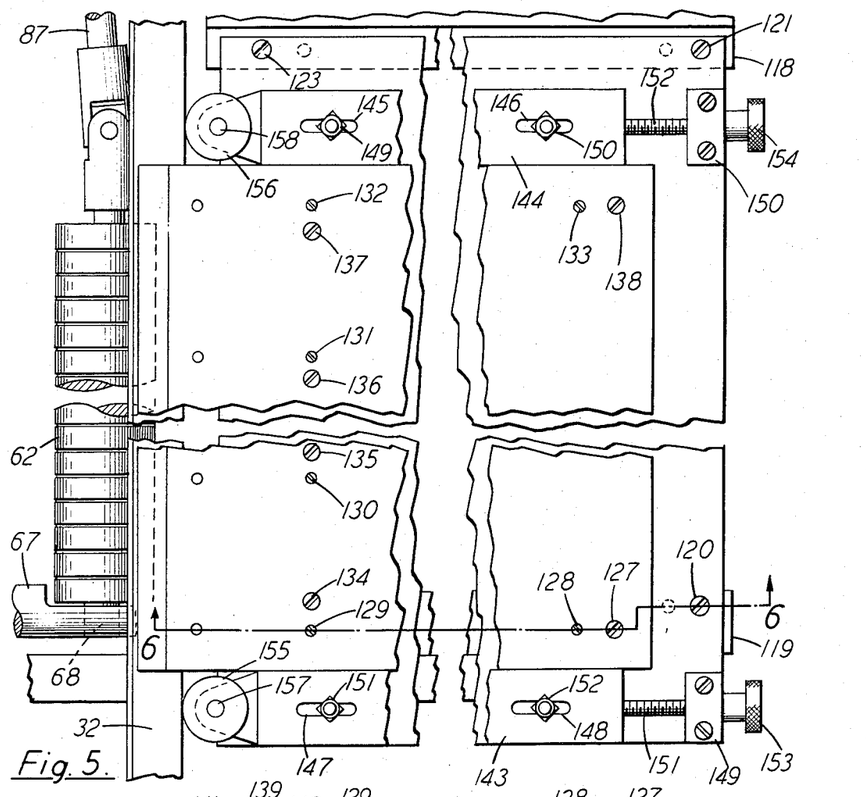
Figure 5 is a plan view on an enlarged scale (from that of Figures 1 and 2) of the guiding system for the knife.
Figure 6:
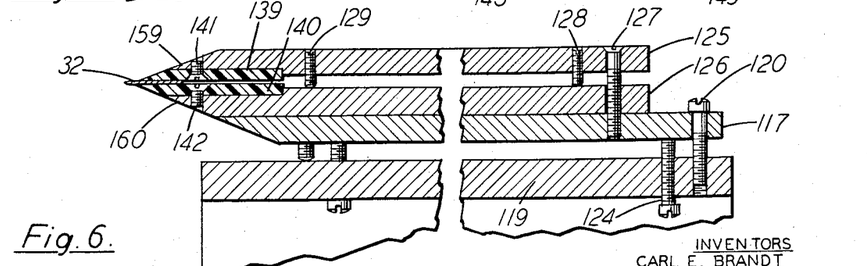
Figure 6 is a section taken on the plane 6—6 of Figure 5.

Referring particularly to Figures 5 and 6, a base plate 117 is secured at opposite sides, respectively, on the flanges 118 and 119 of the frame 10. Approximately at the four corners of the plate 117, a screw as shown at 120, 121 and 123 traverses holes in the plate 117 and engages threaded holes in the flanges 118 and 119. Adjacent to each of these screws, another screw as shown at 124 in Figure 6 engages a threaded hole in one of the frame flanges, and acts as a stop determining the vertical position of the plate 117 with respect to the frame. Jaw plates 125 and 126 are secured to the base plate 117 by screws as shown at 127 in Figure 6, the spacing between the plates being determined by screws as shown at 128 and 129 in Figure 6. Screws 130, 131, 132, and 133 are similar in function to the screws 128 and 129. The screws 134, 135, 136, 137, and 138 are similar in function to the screws 127. Replaceable inserts 139 and 140 are set into the material of the plates 125 and 126 to provide bearing surfaces for the band knife 32. These are held in position, respectively, by the screws 141 and 142.

The slideable members 143 and 144 are mounted on the base plate 117, and move within the confines of elongated slots 145 through 148. Bolts 149 through 152 may be tightened to secure the adjusted position of the sliding members 143 and 144 with respect to the base plate 117. The brackets 149 and 150 serve as terminals for the adjusting screws 151 and 152, which are controlled respectively by the knobs 153 and 154. Adjustment of these knobs will move the sliding members 143 and 144 toward and away from the path of the band knife 32 so that the supporting rollers 155 and 156 may be properly positioned and the band knife 32 thereby confined to its proper position. These rollers are respectively mounted on stub shafts 157 and 158 engaging the sliding members 143 and 144, respectively.

The upper portion of the guiding system adjacent the end which engages the endless band knife 32 (refer to Figure 7) is formed into a slanted surface 159 which serves as a deflector directing the movement of the workpiece away from the cutting area. Similarly, the lower surface of this portion of the guiding system is cut away to form the surface 160, which deflects scrap material into the collecting bin 161.

The relationship of the upper roller 59, the lower roller 62, and the knife 32 changes during the movement of workpieces between the rollers, in the preferred form of the invention. The rotation of the roller 62 about the axis 162 does not take place in a vertical plane, as a result of the inclination of the axis 162. Rotation of the roller 62 about this axis (which serves to alter angular relationship of the roller 62 with respect to the path of movement of the knife 32) not only causes a downward movement of the end of the roller nearest the gear box 88, but also an inward movement thereof toward the blade-guiding system. As the entire roller 62 moves downward into the position shown in dotted lines in Figure 7 to accommodate an increase in thickness of the material (also shown in dotted lines), the movement of the end adjacent the support of the roller 62 is approximately vertical. The lower roller 62 assumes position at various times in which its axis is considerably out of parallel to that of the roller 59. Such variation in position results in a variation in the directions of the component of force applied by the rollers as they feed the material through the cutting area. It will also be noted that a difference in lateral direction of applied force results between the upper and lower surfaces of the workpieces, since the feeding forces will be applied in a direction tangential to the rollers. This particular arrangement has worked out to be a very satisfactory structure, as a result of extensive experiment. With the direction of movement of the active portion of the band knife 32 taking place as shown by the arrows in the drawings, the various geometrical relationships involved seem to establish a reliable and effective control of the workpieces.

It is preferable to include in the machine a mechanism for maintaining the sharpness of the endless band knife 32. A bracket 163 (refer to Figure 1) provides an adjustable mounting for the motors 164 and 165, which respectively drive the grinding wheels 166 and 167. A pair of adjusting screws 168 and 169 serve to position the motors and grinding wheels toward and away from the path of the lower section 170 of the band knife, and the adjusting screws are preferably controlled by a nob as shown at 171. With the position of the two grinding wheels independently controllable, it is possible to position the bevels forming the cutting edge on the endless band knife as may turn out to be desirable as a result of experience.

The particular embodiments of the present invention which have been illustrated and discussed herein are for illustrative purposes only and are not to be considered as a limitation upon the scope of the appended claims. In these claims, it is our intent to claim the entire invention disclosed herein, except as we are limited to the prior art.

We claim:

1. A cutting machine, comprising: a frame; an endless band knife; spaced guide wheels mounted on said frame for rotation on substantially parallel axes and establishing a path of movement for said band knife; a first work-positioning roller rotatably mounted with respect to said frame between said guide wheels on an axis substantially parallel to said band knife and adjacent thereto and below a horizontal portion thereof; support means for said first work-positioning roller, said support means being moveable with respect to said frame about an axis disposed in a plane substantially perpendicular to said band knife at a point adjacent one end of said first work-positioning roller, and also moveable about an axis remote from said band knife and substantially parallel thereto to alter the distance and angular relationship of said first work-positioning roller with respect to said band knife; biasing means urging said first work-positioning roller toward said band knife; stop means limiting the movement of said first work-positioning roller toward said band knife; a second work-positioning roller rotatably mounted with respect to said frame, said second work-positioning roller being disposed adjacent said first work-positioning roller and on the opposite side of the said horizontal portion of said band knife therefrom; support means for said second work-positioning roller, said support means being adjustable with respect to said frame to alter the angular relationship of the axis of said second work-positioning roller to said band knife, and also the distance of said second work-positioning roller therefrom, the axis of said second work-positioning roller being substantially in a plane perpendicular to the portion of said band knife adjacent said second work-positioning roller and containing the cutting edge of said band knife; guide means for said band knife for maintaining the path of movement thereof between said work-positioning rollers, said guide means tapering to reduced thickness adjacent the cutting edge of said band and exposing the same; a collection bin disposed underneath said guide means, said guide means serving to deflect severed strips into said collection bin; and drive means for said work-positioning rollers and for said band knife.

2. A cutting machine, comprising: a frame; an endless band knife; spaced guide wheels mounted on said frame for rotation on substantially parallel axes and establishing a path of movement for said band knife; a first work-positioning roller rotatably mounted with respect to said frame between said guide wheels on an axis substantially parallel to said band knife and adjacent thereto and below a horizontal portion thereof; support means for said first work-positioning roller, said support means being moveable with respect to said frame about an axis disposed in a plane substantially perpendicular to said band knife at a point adjacent one end of said first work-positioning roller, and also moveable about an axis remote from said band knife and substantially parallel thereto to alter the distance and angular relationship of said first work-positioning roller with respect to said band knife; biasing means urging said first work-positioning roller toward said band knife; stop means limiting the movement of said first work-positioning roller toward said band knife; a second work-positioning roller rotatably mounted with respect to said frame, said second work-positioning roller being disposed adjacent said first work-positioning roller and on the opposite side of the said horizontal portion of said band knife therefrom; support means for said second work-positioning roller, the axis of said second work-positioning roller being substantially in a plane perpendicular to the portion of said band knife adjacent said second work-positioning roller and containing the cutting edge of said band knife; guide means for said band knife for maintaining the path of movement thereof between said work-positioning rollers, said guide means tapering to reduced thickness adjacent the cutting edge of said band and exposing the same; a collection bin disposed underneath said guide means, said guide means serving to deflect severed strips into said collection bin; and drive means for said work-positioning rollers and for said band knife.

3. A cutting machine, comprising: a frame; an endless band knife; spaced guide wheels mounted on said frame for rotation on substantially parallel axes and establishing a path of movement for said band knife; a first work-positioning roller rotatably mounted with respect to said frame between said guide wheels on an axis substantially parallel to said band knife and adjacent thereto at one side thereof; support means for said first work-positioning roller, said support means being moveable with respect to said frame about an axis disposed in a plane substantially perpendicular to said band knife at a point adjacent one end of said first work-positioning roller, and also moveable about an axis remote from said band knife and substantially parallel thereto to alter the distance and angular relationship of said first work-positioning roller with respect to said band knife; biasing means urging said first work-positioning roller toward said band knife; stop means limiting the movement of said first work-positioning roller toward said band knife; a second work-positioning roller rotatably mounted with respect to said frame, said second work-positioning roller being disposed adjacent said first work-positioning roller and on the opposite side of said band knife therefrom; support means for said second work-positioning roller; guide means for said band knife for maintaining the path of movement thereof between said work-positioning rollers, said guide means tapering to reduced thickness adjacent the cutting edge of said band and exposing the same; and drive means for said work-positioning rollers and for said band knife.

4. A cutting machine, comprising: a frame; an endless band knife; spaced guide wheels mounted on said frame for rotation on substantially parallel axes and establishing a path of movement for said band knife; a first work-positioning roller rotatably mounted with respect to said frame between said guide wheels on an axis substantially parallel to said band knife and adjacent thereto at one side thereof; support means for said first work-positioning roller, said support means being moveable with respect to said frame about an axis disposed in a plane substantially perpendicular to said band knife at a point adjacent one end of said first work-positioning roller, and also moveable about an axis remote from said band knife and substantially parallel thereto to alter the distance and angular relationship of said first work-positioning roller with respect to said band knife; biasing means urging said first work-positioning roller toward said band knife; stop means limiting the movement of said first work-positioning roller toward said band knife; a second work-positioning roller rotatably mounted with respect to said frame, said second work-positioning roller being disposed adjacent said first work-positioning roller and on the opposite side of said band knife therefrom; support means for said second work-positioning roller; and drive means for said work-positioning rollers and for said band knife.

5. A cutting machine, comprising: a frame; an endless band knife; spaced guide wheels mounted on said frame for rotation on substantially parallel axes and establishing a path of movement for said band knife; a first work-positioning roller rotatably mounted with respect to said frame between said guide wheels on an axis substantially parallel to said band knife and adjacent thereto at one side thereof; support means for said first work-positioning roller, said support means being moveable with respect to said frame to alter the angular relationship of said first work-positioning roller with respect to said band knife, and also to alter the distance from said first work-positioning roller to said band knife; biasing means urging said first work-positioning roller toward said band knife; stop means limiting the movement of said first work-positioning roller toward said band knife; a second work-positioning roller rotatably mounted with respect to said frame, said second work-positioning roller being disposed adjacent said first work-positioning roller and on the opposite side of said band knife therefrom; support means for said second work-positioning roller; guide means for said band knife for maintaining the path of movement thereof between said work-positioning rollers, said guide means tapering to reduced thickness adjacent the cutting edge of said band and exposing the same; and drive means for said work-positioning rollers and for said band knife.

6. A cutting machine, comprising: a frame; an endless band knife; spaced guide wheels mounted on said frame for rotation and establishing a path of movement for said band knife; a first work-positioning roller rotatably mounted with respect to said frame between said guide wheels on an axis substantially parallel to said band knife and adjacent thereto at one side thereof; support means for said first work-positioning roller, said support means being moveable with respect to said frame to alter the angular relationship of said first work-positioning roller with respect to said band knife, and also to alter the distance from said first work-positioning roller to said band knife; biasing means urging said first work-positioning roller toward said band knife; stop means limiting the movement of said first work-positioning roller toward said band knife; a second work-positioning roller rotatably mounted with respect to said frame, said second work-positioning roller being disposed adjacent said first work-positioning roller and on the opposite side of said band knife therefrom; support means for said second work-positioning roller; and drive means for said work-positioning rollers and for said band knife.

7. A cutting machine, comprising: a frame; an endless band knife; spaced guide wheels mounted on said frame for rotation on substantially parallel axes and establishing a path of movement for said band knife; a first work-positioning roller rotatably mounted with respect to said frame between said guide wheels on an axis substantially parallel to said band knife and adjacent thereto; support means for said first work-positioning roller, said support means being moveable with respect to said frame to alter the angular relationship of said first work-positioning roller with respect to said band knife, and also to alter the distance from said first work-positioning roller to said band knife; biasing means urging said first work-positioning roller toward said band knife; stop means limiting the movement of said first work-positioning roller toward said band knife; a second work-positioning roller rotatably mounted with respect to said frame, said second work-positioning roller being disposed adjacent said first work-positioning roller and on the opposite side of said band knife therefrom; support means for said work-positioning roller, the axis of said second work-positioning roller being substantially in a plane perpendicular to the portion of said band knife adjacent said second work-positioning roller and containing the cutting edge of said band knife; and drive means for said work-positioning rollers and for said band knife, said drive means for said rollers including a gear box having portions thereof disposed on opposite sides of said band knife.

8. A cutting machine, comprising: a frame; a knife; means for moving said knife along a path parallel to the edge thereof; a first work-positioning roller rotatably mounted with respect to said frame on an axis substantially parallel to said band knife and adjacent thereto and below a horizontal portion thereof; support means for said work-positioning roller, said support means being moveable with respect to said frame about an axis inclined to the horizontal and disposed in a plane substantially perpendicular to said band knife at a point adjacent one end of said first work-positioning roller, and also moveable about an axis remote from said band knife and substantially parallel thereto to alter the angular relationship of said first work-positioning roller with respect to said band knife, and also to alter the distance from said work-positioning roller to said band knife; biasing means urging said first work-positioning roller toward said band knife; stop means limiting the movement of said first work-positioning roller toward said band knife; a second work-positioning roller rotatably mounted with respect to said frame, said second work-positioning roller being disposed adjacent said first work-positioning roller and on the opposite side of the said horizontal portion of said band knife therefrom; support means for said second work-positioning roller, the axis of said second work-positioning roller being substantially in a plane perpendicular to the portion of said band knife adjacent said second work-positioning roller and containing the cutting edge of said band knife; and drive means for at least one of said work-positioning rollers and for said band knife.

9. A cutting machine, comprising: a frame, a knife; means for moving said knife along a path parallel to the edge thereof; a first work-positioning roller rotatably mounted with respect to said frame on an axis substantially parallel to the edge of said knife and adjacent thereto; support means for said first work-positioning roller, said support means being moveable with respect to said frame to alter the angular relationship of said first work-positioning roller with respect to said band knife, and also to alter the distance from said first work-positioning roller to said band knife; biasing means urging said first work-positioning roller toward said band knife; means limiting the movement of said first work-positioning roller toward said band knife; a second work-positioning roller rotatably mounted with respect to said frame, said second work-positioning roller being disposed adjacent said first work-positioning roller and on the opposite side of said band knife therefrom; support means for said second work-positioning roller; and drive means for at least one of said work-positioning rollers and for said band knife.

References Cited in the file of this patent

UNITED STATES PATENTS

| | | |
|---|---|---|
| 1,709,336 | Ballard | Apr. 16, 1929 |
| 1,915,988 | Frank | June 27, 1933 |
| 1,956,285 | Harshberger | Apr. 24, 1934 |
| 2,214,461 | Hendry | Sept. 10, 1940 |